(12) United States Patent
Kobayashi et al.

(10) Patent No.: US 11,372,614 B2
(45) Date of Patent: Jun. 28, 2022

(54) ELECTRONIC APPARATUS, CONTROL METHOD THEREOF, AND STORAGE MEDIUM

(71) Applicant: CANON KABUSHIKI KAISHA, Tokyo (JP)

(72) Inventors: Yoshihiro Kobayashi, Kawasaki (JP); Tomokazu Mori, Fujisawa (JP); Akitaka Yoshizawa, Yokohama (JP); Hitoshi Nishitani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/786,358

(22) Filed: Feb. 10, 2020

(65) Prior Publication Data

US 2020/0264832 A1 Aug. 20, 2020

(30) Foreign Application Priority Data

Feb. 18, 2019 (JP) .............................. JP2019-026719

(51) Int. Cl.
| | |
|---|---|
| *G06F 3/16* | (2006.01) |
| *H04R 1/10* | (2006.01) |
| *H04R 3/12* | (2006.01) |
| *H04R 1/02* | (2006.01) |

(Continued)

(52) U.S. Cl.
CPC ............. *G06F 3/165* (2013.01); *H04R 1/028* (2013.01); *H04R 1/1041* (2013.01); *H04R 3/12* (2013.01);

(Continued)

(58) Field of Classification Search
CPC ............ H04R 2499/11; H04R 2499/15; H04R 2420/03; H04R 2420/05; H04R 2420/07;
(Continued)

(56) References Cited

U.S. PATENT DOCUMENTS

2004/0196985 A1* 10/2004 Kokubo ............... H04M 1/6033
381/79
2005/0157177 A1* 7/2005 Fukushima ............ H04N 5/772
348/207.99
(Continued)

FOREIGN PATENT DOCUMENTS

| CN | 101271433 A | 9/2008 |
|---|---|---|
| CN | 101963885 A | 2/2011 |

(Continued)

*Primary Examiner* — Leshui Zhang
(74) *Attorney, Agent, or Firm* — Canon U.S.A., Inc. I.P. Division

(57) ABSTRACT

An electronic apparatus includes an internal speaker, a communication unit configured to perform a wireless communication with a wearable external speaker, and a control unit. The control unit establishes wireless connection with the external speaker through the communication unit and the control unit continuously performs a control operation for preventing an output of an audio signal from the internal speaker in a case where the wireless connection with the external speaker is disconnected by a first factor in a state where the control unit performs the control operation. The control unit cancels performance of the control operation in a case where the wireless connection with the external speaker is disconnected by a second factor different from the first factor in a state where the control unit performs the control operation for preventing the output of the audio signal from the internal speaker.

15 Claims, 9 Drawing Sheets

(51) Int. Cl.
*H04M 1/60* (2006.01)
*H04M 1/72454* (2021.01)
*H04M 1/72412* (2021.01)

(52) U.S. Cl.
CPC ...... *H04R 2420/05* (2013.01); *H04R 2420/07* (2013.01); *H04R 2499/11* (2013.01); *H04R 2499/15* (2013.01)

(58) Field of Classification Search
CPC .......... H04R 3/12; H04R 1/1041; H04R 3/00; H04R 3/14; H04R 2499/00; H04R 2499/10; H04R 2499/13; H04R 1/028; H04R 2400/11; H04R 1/10; H04R 1/02; G06F 3/165; G06F 3/167; G06F 3/16; G06F 3/162; H04M 1/72569; H04M 1/72577; H04M 2250/52; H04M 1/6066; H04M 2250/02; H04M 1/72454; H04M 1/60; H04M 1/72412; H04M 2201/34; H04W 4/02; H04N 5/232; G10L 25/51
USPC ............... 381/74, 312–321, 33, 79, 85, 123, 381/300–311, 1–23; 700/94
See application file for complete search history.

(56) References Cited

U.S. PATENT DOCUMENTS

| | | | | |
|---|---|---|---|---|
| 2007/0142942 | A1* | 6/2007 | Hyatt | H04M 1/6058 700/94 |
| 2011/0007916 | A1* | 1/2011 | Chapero-Rueda | H04R 25/552 381/315 |
| 2011/0022203 | A1* | 1/2011 | Woo | G06F 9/4413 700/94 |
| 2018/0152795 | A1* | 5/2018 | Lee | G10K 11/17833 |

FOREIGN PATENT DOCUMENTS

| | | | | |
|---|---|---|---|---|
| CN | 103581795 | A | | 2/2014 |
| CN | 104767868 | A | | 7/2015 |
| CN | 106878921 | A * | 6/2017 | .......... H04B 5/0006 |
| CN | 107145325 | A * | 9/2017 | .............. G06F 3/16 |
| CN | 107145325 | A | | 9/2017 |
| CN | 107682770 | A | | 2/2018 |
| CN | 109151647 | A | | 1/2019 |
| JP | 2003-58977 | A | | 2/2003 |

* cited by examiner

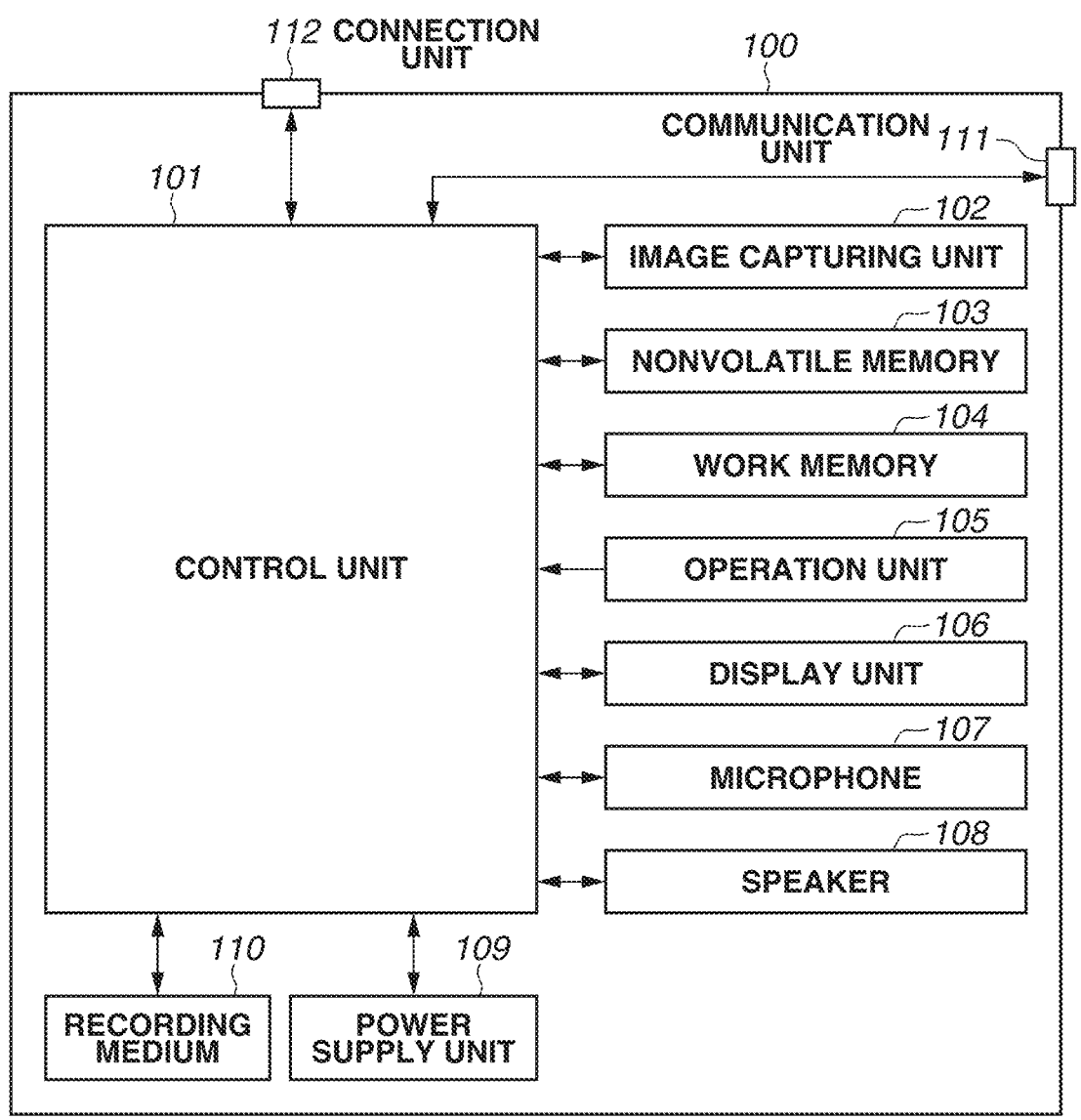

FIG.2A

| SETTING MENU | |
|---|---|
| SHUTTER MODE | ELECTRONIC |
| SILENT MODE | OFF |

200 — SHUTTER MODE row
210 — SILENT MODE row

FIG.2B

| SETTING MENU | |
|---|---|
| SHUTTER MODE | MECHANICAL |
|  | ELECTRONIC |

201 — MECHANICAL
202 — ELECTRONIC

FIG.2C

| SETTING MENU | |
|---|---|
| SILENT MODE | ON |
|  | OFF |

211 — ON
212 — OFF

ELECTRONIC APPARATUS, CONTROL METHOD THEREOF, AND STORAGE MEDIUM

BACKGROUND

Field

The present disclosure relates to an electronic apparatus including an audio output unit.

Description of the Related Art

An electronic apparatus such as a smartphone can output a sound from an internal speaker and an external speaker. For example, a smartphone can automatically output a sound to a headphone, which is an external speaker, upon detecting a connection of the headphone, and to perform a control operation for preventing an output of sound from an internal speaker. The smartphone can also perform a control operation for automatically outputting a sound from the internal speaker upon detecting that the headphone is disconnected.

Japanese Patent Application Laid-Open No. 2003-58977 discusses a portable electronic apparatus that switches an audio output between an earphones and a speaker depending on whether the earphone is connected to the electronic apparatus.

However, the connection between the smartphone and headphone may be unexpectedly disconnected by a user operation or the like. In such a case, a sound may be output from the internal speaker of the smartphone. For example, if a headphone worn by a supporter observing a sports game is unexpectedly disconnected from a smartphone owned by the supporter observing the game, a sound may be unexpectedly output from the smartphone owned by the supporter and the sound may disturb the game.

SUMMARY

According to an aspect of the present disclosure, an electronic apparatus includes an internal speaker, a communication unit configured to perform a wireless communication with a wearable external speaker, and a control unit The control unit establishes wireless connection with the external speaker through the communication unit. The control unit continuously performs a control operation for preventing an output of an audio signal from the internal speaker in a case where the wireless connection with the external speaker is disconnected by a first factor in a state where the control unit performs the control operation. The control unit cancels performance of the control operation in a case where the wireless connection with the external speaker is disconnected by a second factor different from the first factor in a state where the control unit performs the control operation for preventing the output of the audio signal from the internal speaker.

Further features of the present disclosure will become apparent from the following description of exemplary embodiments with reference to the attached drawings.

BRIEF DESCRIPTION OF THE DRAWINGS

FIG. 1 is a block diagram illustrating a configuration example of a digital camera according to a first exemplary embodiment.

FIG. 2A illustrates an example of a screen display for setting an image capturing mode and a silent mode of the digital camera, FIG. 2B illustrates an example of a screen display for setting the image capturing mode of the digital camera, and FIG. 2C illustrates an example of a screen display for setting the silent mode of the digital camera, according to the first exemplary embodiment.

DESCRIPTION OF THE EMBODIMENTS

Figure 3A:
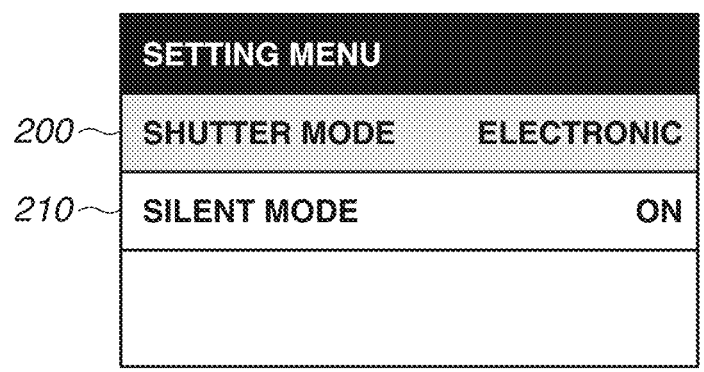
FIG. 3A illustrates an example of a setting screen of the digital camera to which no headphone is connected.

Exemplary embodiments of the present disclosure will be described below with reference to the accompanying drawings.

[Configuration of Digital Camera 100]

FIG. 1 is a block diagram illustrating a configuration example of a digital camera 100, which is an example of an electronic apparatus according to a first exemplary embodiment. A digital camera is employed as an example of the electronic apparatus according to the first exemplary embodiment. However, the electronic apparatus is not limited to a digital camera. For example, any electronic apparatus, such as a smartphone or a tablet terminal, can be used as long as the apparatus includes an internal speaker and is connectable to an external speaker.

A control unit 101 controls each unit of the digital camera 100 based on an input signal or a program to be described below. The control unit 101 can convert audio data recorded in a nonvolatile memory 103 and a recording medium 110, which are described below, into an audio signal, and can output the audio signal through a speaker 108, a communication unit 111, and a connection unit 112 instead of controlling the entire apparatus by the control unit 101, the entire apparatus may be controlled by a plurality of pieces of hardware sharing the processing.

An image capturing unit 102 includes, for example, an optical lens unit, an optical system that controls an aperture, zooming, focusing, and the like, and an image sensor for converting light (video image) introduced through the optical lens unit into an electric video image signal. In general, a complementary metal oxide semiconductor (CMOS) sensor or a charge-coupled device (CCD) sensor is used as the image sensor. By being controlled by the control unit 101, the image capturing unit 102 causes the image sensor to convert object light focused by a lens included in the image capturing unit 102 into an electric signal, and performs noise reduction processing and the like, and then outputs digital data as image data. The image capturing unit 102 also includes a light-shielding shutter with which an exposure time for the image sensor can be arbitrarily controlled based on a control operation by the control unit 101. The light-shielding shutter is, for example, a focal plane shutter or a lens shutter. In the present exemplary embodiment, a series of processes for capturing the image data and outputting the image data is referred to as "image capturing". The digital camera 100 according to the present exemplary embodiment records the image data on the recording medium 10, which is described below, in accordance with Design Rule for Camera File system (DCF) standards.

The nonvolatile memory 103 is an electrically erasable/recordable nonvolatile memory, and stores, for example, a program described below that is executed by the control unit 101. The nonvolatile memory 103 also stores audio data. Examples of the audio data include data on electric sounds such as a focusing sound to be output when an object is focused, an electronic shutter sound to be output when an image is captured, and an operation sound to be output when the digital camera 100 is operated. In the first exemplary embodiment, the electronic shutter sound is a sound effect imitating a sound to be made when the light-shielding shutter of the image capturing unit 102 is opened or closed. However, the tone, length, and the like of the electronic shutter sound may be greatly different from those of the actual sound to be made when the light-shielding shutter is opened or closed, as long as a user can recognize that an image is captured. The audio data is recorded in a format such as a pulse code modulation (PCM) format or a Moving Picture Experts Group (MPEG)-1 Audio Layer-3 (MP3) format.

A work memory 104 is used as a buffer memory for temporarily holding image data obtained by capturing an image by the image capturing unit 102, an image display memory for a display unit 106, a work area for the control unit 101, and the like.

An operation unit 105 is a user interface for receiving an instruction for the digital camera 100 from a user. The operation unit 105 may include, for example, a power supply button used by the user to instruct turning on/off of the digital camera 100, a release switch used by the user to instruct image capturing, and a reproduction button used by the user to instruct reproduction of image data. The operation unit 105 may also include a touch panel formed on the display unit 106. The release switch includes SW1 and SW2. When the release switch is in a so-called half-pressed state, the SW1 is turned on. With this operation, the operation unit 105 receives a preparation instruction for performing a preparation operation for image capturing, such as autofocus (AF) processing, automatic exposure (AE) processing, automatic white balance (AWB) processing, or flash preliminary emission (so-called EF) processing. When the release switch is in a so-called fully-pressed state, the SW2 is turned on. Through a user operation described above, the operation unit 105 receives an image capturing instruction for performing an image capturing operation. The operation unit 105 also includes a mode selection switch and switches an operation mode of the control unit 101 to any one of a still image capturing mode, a moving image capturing mode, a reproduction mode, and the like. The still image capturing mode includes an automatic image capturing mode, an automatic scene determination mode, a manual mode, an aperture priority mode (Av mode), a shutter speed priority mode (Tv mode), and a program AE mode. The still image capturing mode also includes various scene modes for image capturing settings for each image capturing scene, and a custom mode.

The mode selection switch enables the user to directly switch the operation mode to any one of the modes described above. Alternatively, after the display is temporarily switched to an image capturing mode list screen by the mode selection switch, any one of a plurality of displayed modes may be selected to switch the display by using another operation member. The operation unit 105 also includes a button for adjusting, for example, the volume of sound to be output from the speaker 108, the communication unit 111, and the connection unit 112, which are described below. By accepting a user operation through the button, the control unit 101 executes processing for adjusting an amplitude of an audio signal and the like, and processing for determining whether to output an audio signal.

For example, the display unit 106 displays a viewfinder image during image capturing, displays captured image data, and displays characters for interactive operation. The display unit 106 is not necessarily incorporated in the digital camera 100, and may be externally connected to the digital camera 100. The digital camera 100 only needs to be connectable with the display unit 206, which is an internal or external display unit, and to include at least a display control function for controlling the display of the display of the display unit 106.

The recording medium 110 may be attachable to and detachable from the digital camera 100, or may be incorporated in the digital camera 100. The digital camera 100 only needs to include at least a unit for accessing the recording medium 110.

A microphone 107 is used for inputting a sound wave such as a sound or voice. The microphone 107 converts the sound or voice into an electric signal and outputs the electric signal to the digital camera 100. The control unit 101 generates audio data based on the received electric signal. The control unit 101 records, in a synchronized manner, the audio data and moving image data obtained by capturing an image by the image capturing unit 102. In the present exemplary embodiment, audio data to be transmitted by live streaming is recorded on the work memory 104. The microphone 107 may be attachable to and detachable to the digital camera 100, or may be incorporated in the digital camera 100. In other words, the digital camera 100 only needs to include at least a unit for receiving an electric signal from the microphone 107.

The speaker 108 is an electroacoustic transducer capable of outputting an electronic sound such as a music or a warning sound. In the present exemplary embodiment, the control unit 101 can convert the audio data recorded on the nonvolatile memory 103 into an audio signal, and can output the audio signal as a warning sound or the like from the speaker 108. The speaker 108 is an example of the internal speaker. For example, by hearing the sound output from the speaker 108, the user can realize a warning or the like by the digital camera 100.

By being controlled by the control unit 101, a power supply unit 109 can supply power to each element of the digital camera 100. The power supply unit 109 is, for example, a lithium ion battery or an alkaline manganese battery.

The communication unit 111 is an interface for establishing a wireless connection with an external apparatus. The digital camera 100 according to the present exemplary embodiment can exchange data with the external apparatus through the communication unit 111. For example, image data generated by the image capturing unit 102 and audio data recorded on the nonvolatile memory 103 can be transmitted to the external apparatus through the communication unit 111. The external apparatus is, for example, an information apparatus such as a smartphone or a personal computer (PC). In the present exemplary embodiment, the communication unit 111 includes an interface for communicating with the external apparatus in accordance with Bluetooth® standards. The control unit 101 controls the communication unit 111 to thereby implement a wireless communication with the external apparatus. The communication method is not limited to Bluetooth®, but instead may include, for example, a wireless communication method, such as a so-called wireless local area network (LAN) and infrared communication, in accordance with Institute of Electrical and Electronics Engineers (IEEE) 802.11 standards. The control unit 101 can also establish a wireless connection with a wearable external speaker, such as an earphone or a headphone, through the communication unit 111. The communication unit 111 may be configured to be attachable to and detachable from the digital camera 100, or may be incorporated in the digital camera 100. The digital camera 100 only needs to include at least a unit for accessing the communication unit 111.

The connection unit 112 is an interface for establishing a wired connection with the external apparatus. The digital camera 100 according to the present exemplary embodiment can exchange data with the external apparatus through the connection unit 112. For example, image data generated by the image capturing unit 102 and audio data recorded on the nonvolatile memory 103 can be transmitted to the external apparatus through the connection unit 112. The connection unit 112 is, for example, a phone connector (so-called headphone terminal), or a universal serial bus (USB) terminal. The digital camera 100 can establish a wired connection with an external speaker, such as an earphone or a headphone, and an information apparatus, such as a smartphone or a PC, through the connection unit 112. The connection unit 112 includes a detection unit (not illustrated) that detects whether the external apparatus is connected. The control unit 101 can detect that, for example, the external apparatus is connected or disconnected, the external apparatus is in the connected state, and the digital camera 100 is not connected with the external apparatus, through the detection unit. The connection unit 112 may be configured to be attachable to and detachable from the digital camera 100, or may be incorporated in the digital camera 100. The digital camera 100 only needs to include at least a unit for accessing the connection unit 112.

When the digital camera 100 is connected with the external apparatus, such as a headphone, the control unit 101 establishes a connection with the external apparatus and then detects the type of the apparatus. For example, in a case of pairing with the external apparatus in Bluetooth® communication through the communication unit 111, the control unit 101 can detect whether the external apparatus is a headphone. Alternatively, in Bluetooth® communication, the control unit 101 receives information indicating whether the external apparatus is a headphone before a wireless connection with the external apparatus is established. The term "pairing" refers to a method in which communication apparatuses register (record on a predetermined area) identification information or the like about the respective communication apparatuses as identification information or the like about a partner to be communicated. Therefore, before establishing a wireless connection with the external apparatus, the control unit 101 can determine whether the external apparatus is a headphone. On the other hand, in wireless LAN communication through the communication unit 111, the control unit 101 establishes a wirelessly connection with the external apparatus, and then communicates with the external apparatus to detect whether the external apparatus is a headphone.

For example, when a USB terminal is used as the connection unit 112, the control unit 101 receives a device descriptor from the external apparatus with which a wired connection is established. By referring to the device descriptor, the control unit 101 can detect whether the external apparatus is a headphone. However, if the external apparatus that is permitted to establish a wireless connection with the digital camera 100 is limited to the external speaker, such as a headphone, the control unit 101 can determine whether a headphone is detected based on whether a wireless connection with the external apparatus is established. An external speaker terminal, such as a phone connector, is a terminal to be used on the premise that the connection partner is a speaker. Accordingly, when a wireless connection with the external apparatus is established through the terminal, the control unit 101 can determine whether a headphone is detected by detecting that a wired connection with the external apparatus is established, without receiving any information from the connection partner.

The configuration of the digital camera 100 has been described above.

[Description of Image Capturing Modes]

Image capturing modes of the digital camera 100 will now be described. The digital camera 100 includes two image capturing modes, i.e., an electronic shutter mode and a mechanical shutter mode.

In the mechanical shutter mode, the control unit 101 controls the light-shielding shutter included in the image capturing unit 102 to be opened or closed, thereby exposing the image sensor to light to capture an image. The image capturing operation in the mechanical shutter mode is advantageous in that, for example, a so-called rolling shutter distortion is less likely to occur, and noise is less likely to occur in a captured image.

In the electronic shutter mode, the control unit 101 captures an image without opening or closing the light-shielding shutter. In an image capturing operation in the electronic shutter mode, the light-shielding shutter is opened. The control unit 101 refers to a clock unit (not illustrated) to thereby control the exposure time for the image sensor included in the image capturing unit 102. The image capturing operation in the electronic shutter mode is advantageous in that, for example, a shutter speed higher than that in the mechanical shutter mode can be achieved, and vibrations are less likely to occur during the image capturing operation.

In the image capturing operation in the electronic shutter mode, the light-shielding shutter is not opened or closed, and thus a so-called shutter sound is not generated. Accordingly, the control unit 101 outputs the electronic shutter sound recorded on the nonvolatile memory 103 through the speaker 108, the communication unit 111, or the connection unit 112.

The user can cause the digital camera 100 to operate in a silent mode. In the silent mode, the digital camera 100 does not output any electronic sound from the speaker 108. Examples of the electronic sound include a focusing sound, an electronic shutter sound, and an operation sound. The silent mode is a mode suitable for image capturing in places, such as a sports game site and a museum, where silence is required. The user can turn on/off the silent mode by operating the digital camera 100 through the operation unit 105. Further, according to the present exemplary embodiment, in the silent mode, the digital camera 100 operates in the electronic shutter mode. This is because, in the mechanical shutter mode, a sound to be made when the light-shielding shutter is opened or closed is generated during image capturing, and thus image capturing cannot be executed without making any sound. On the other hand, in the electronic shutter mode, the light-shielding shutter is not opened or closed, and thus image capturing can be executed without making any sound. In addition, in the silent mode, the digital camera 100 does not execute light emission processing such as flush pre-emission processing or AF assist light processing. This is because flash image capturing is prohibited on, for example, athletes in sport games, or pictures in museums.

Also, in the silent mode, the digital camera 100 can output the electronic sound to the headphone or the like through the communication unit 111 and the connection unit 112. This is because it is considered that, even when the digital camera 100 outputs the electronic sound to the headphone or the like, the electronic sound is transmitted only to the user who uses the digital camera 100, so that it is less likely that the electronic sound output from the headphone can be heard by surrounding people.

[Image Capturing Mode Setting Method]

Figure 3B:
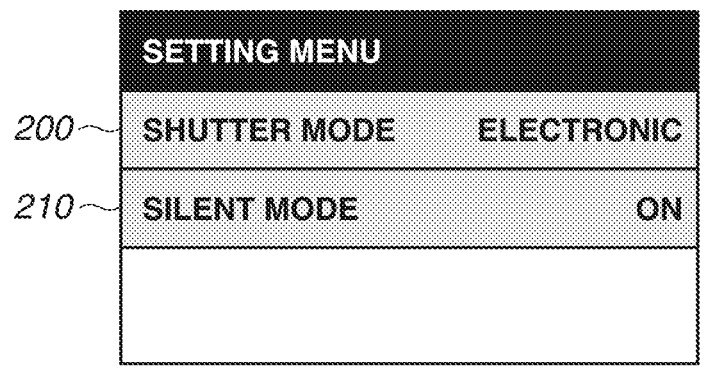
FIG. 3B illustrates an example of a setting screen of the digital camera to which a headphone is connected, according to the first exemplary embodiment.

Next, an example of a method for setting the image capturing mode will be described. FIGS. 2A to 2C each illustrate a menu screen for setting the image capturing mode and the silent mode. FIGS. 3A and 3B each illustrate an example of a menu screen to be displayed when the operation mode is shifted to the silent mode. Upon accepting a user operation for shifting to the menu screen through the operation unit 105, the control unit 101 displays, for example, a menu screen on the display unit 106. The user can change each setting by operating the operation unit 105. In the present exemplary embodiment, the control unit 101 displays the menu screen as illustrated in FIG. 2A. An item 200 is an item for setting the image capturing mode. An item 210 is an item for setting whether the digital camera 100 operates in the silent mode. In the present exemplary embodiment, when a certain item is selected, the control unit 101 performs a control operation for preventing the display unit 106 from displaying the other items. This facilitates the user to select options for the selected item.

When the user selects the item 200 through the operation unit 105, as illustrated in FIG. 2B, the control unit 101 displays a menu for selecting one of the mechanical shutter mode and the electronic shutter mode. When the user selects an option 201, the digital camera 100 changes the setting to a setting for image capturing in the mechanical shutter mode. In this case, the control unit 101 performs a control operation for preventing the output of the electronic shutter sound to the speaker 108, regardless of the setting for the electronic sound. This is because, for example, in a case where the user performs image capturing, if both the electronic shutter sound and the sound to be made when the light-shielding shutter of the image capturing unit 102 is opened or closed are heard, it may be difficult for the user to discriminate the tinting at which an image is captured. When the user selects an option 202, the digital camera 100 changes the setting to a setting for image capturing in the electronic shutter mode. In this case, when a mode other than the silent mode is set, the control unit 101 performs a control operation for outputting the electronic sound to the speaker 108.

Referring back to FIG. 2A, when the user selects the item 210 through the operation unit 105, the control unit 101 displays a menu for selecting whether to operate in the silent mode ("ON" or "OFF") as illustrated in FIG. 2C. When the user selects an option 211 ("ON") through the operation unit 105, the digital camera 100 operates in the silent mode. When the user selects an option 212 ("OFF") through the operation unit 105, the digital camera 100 cancels the silent mode. Also, when the setting is changed to the mechanical shutter mode by a user operation in a state where the silent mode is set to "ON", the control unit 101 automatically cancels the silent mode. When the user selects the option 211 ("ON"), the control unit 101 controls the digital camera 100 to operate in the electronic shutter mode and controls the speaker 108 not to output any electronic sound. In this case, as illustrated in FIG. 3A, the control unit 101 may display, for example, the item 200 as a shaded area, to thereby prevent the setting from changing from the electronic shutter mode to the mechanical shutter mode.

For example, if a headphone is connected, the control unit 101 makes a setting for automatically operating in the silent mode. In this case, the control unit 101 changes the setting for the shutter mode to the electronic shutter mode and changes the setting for the silent mode to "ON". In this case, the control unit 101 outputs the electronic sound to the connected headphone, and does not output the electronic sound to the speaker 108. When the headphone is connected, the user can determine that it is highly likely that the electronic sound from the headphone can be heard by the user, and thus the control unit 101 does not output the electronic sound from the speaker 108. As illustrated in FIG. 3B, the control unit 101 may display, for example, the item 200 and the item 210 as a shaded area. Further, the control unit 101 may prevent the settings for the item 200 and the item 210 from being changed until the headphone is disconnected by the user.

In the present exemplary embodiment, the item for setting the silent mode is provided. However, the item may be replaced with an item for setting whether to Output the electronic sound. In this case, the user operates the digital camera 100 and changes the settings to the setting for the electronic shutter mode and the setting for preventing the output of the electronic sound, thereby enabling the digital camera 100 to substantially operate in the silent mode.

[Silent Mode Setting Processing]

Processing in which the control unit 101 changes the setting for causing the digital camera 100 to operate in the silent mode will be described with reference to FIG. 4. The present exemplary embodiment is described assuming that the external speaker to be connected to the digital camera 100 is a headphone. The processing by the digital camera 100 is implemented in such a manner that software recorded on the nonvolatile memory 103 is loaded into the work memory 104 and the control unit 101 executes the software. This processing is started triggered by power-on of the digital camera 100.

In step S401, the control unit 101 determines whether the headphone is connected. For example, the control unit 101 detects whether the external apparatus connected through the connection unit 112 or the communication unit 111 is the headphone. If the headphone is connected (YES in step S401), the processing proceeds to step S402. If the headphone is not connected (NO in step S401), the processing proceeds to step S404. The case where the headphone is connected to the digital camera 100 will now be described.

In step S402, the control unit 101 performs a control operation for outputting the electronic sound to the headphone. This does not indicate that the control unit 101 constantly outputs the electronic sound to the headphone, but indicates that the control unit 101 outputs the electronic sound to the headphone when the electronic sound, such as an operation sound or an electronic shutter sound, is reproduced. However, if the control operation for outputting the electronic sound to the headphone is already performed, the control unit 101 does not execute the processing of step S402.

In step S403, the control unit 101 controls the digital camera 100 to automatically operate in the silent mode. Further, the control unit 101 may record the setting for the shutter mode before causing the digital camera 100 to operate in the silent mode. The recorded shutter mode is used for processing by the control unit 101 cancelling the silent mode in step S408. If the silent mode is already set, the control unit 101 does not execute the processing of step S403. In this case, the processing proceeds to step S409, and the processing of this flowchart is repeated until a power-off operation is executed. In step S409, the control unit 101 also performs a control operation for preventing light emission processing, such as AF assist light processing or flash light emission processing, from being executed.

In this way, when the headphone is connected, the control unit 101 controls the digital camera 100 to continuously operate in the silent mode. Next, the case where the control unit 101 determines that the headphone is not connected to the digital camera 100 in step S401 will now be described.

In step S404, the control unit 101 performs the control operation for preventing the output of the electronic sound to the headphone. In step S404, although the connection between the digital camera 100 and the headphone is disconnected, the control unit 101 does not automatically cancel the silent mode. However, if the control operation for preventing the output of the electronic sound to the headphone is already performed, the control unit 101 does not execute the processing of step S404.

In step S405, the control unit 101 determines whether the digital camera 100 is operating in the silent mode. If the digital camera 100 is not operating in the silent mode (NO in step S405), the processing proceeds to step S406. If the digital camera 100 is operating in the silent mode (YES in step S405), the processing proceeds to step S407. The case where the digital camera 100 is not operating in the silent mode will now be described.

In step S406, the control unit 101 determines whether a user operation for setting the silent mode is executed. For example, in a state where the menu screen as illustrated in FIG. 3A is displayed, the user selects the item 210 through the operation unit 105, and the control unit 101 determines whether the silent mode is turned on. If a user operation for setting the silent mode is executed (YES in step S406), the processing proceeds to step S403 to control the digital camera 100 to operate in the silent mode. If the user operation for setting the silent mode is not executed (NO in step S406), the processing proceeds to step S409 to repeat the processing of this flowchart until the power-off operation is executed. Next, the case where the digital camera 100 is operating in the silent mode will now be described.

In step S407, the control unit 101 determines whether a user operation for cancelling the silent mode is executed. For example, in a state where the menu screen as illustrated in FIG. 3A is displayed, the user selects the item 210 through the operation unit 105, and the control unit 101 determines whether the silent mode is turned off. If the user operation for cancelling the silent mode is executed (YES in step S407), the processing proceeds to step S408. If the user operation for cancelling the silent mode is not executed (NO in step S407), the processing proceeds to step S409 to repeat the processing of this flowchart until the power-off operation is executed.

In step S408, the control unit 101 performs a control operation for cancelling the silent mode of the digital camera 100. For example, the control unit 101 cancels the silent mode and controls the digital camera 100 to operate in the electronic shutter mode. For example, when the shutter mode is recorded before the digital camera 100 is caused to operate in the silent mode in step S403, the control unit 101 may control the digital camera 100 to operate in the shutter mode. After step S408, the processing proceeds to step S409 to repeat the processing of this flowchart until the power-off operation is executed.

As described above, the control unit 101 does not automatically cancel the silent mode even when the connection between the digital camera 100 and the headphone is disconnected. When the digital camera 100 is not connected with the headphone, the silent mode is cancelled by a user operation.

In step S409, the control unit 101 determines whether to power off the digital camera 100. For example, if a user operation for turning off the power supply button is executed, the control unit 101 determines to power off the digital camera 100 (YES in step S409), and then the processing is terminated. For example, if a user operation is not executed for a predetermined period, the control unit 101 determines to power off the digital camera 100 (YES in step S409), and then the processing is terminated. If the control unit 101 determines not to power off the digital camera 100 (NO in step S409), the processing returns to step S401 to repeat the processing of this flowchart.

The processing in which the control unit 101 determines whether to cause the digital camera 100 to operate in the silent mode has been described above. As described above, the control unit 101 causes the digital camera 100 to operate in the silent mode when the headphone is connected, and the control unit 101 causes the digital camera 100 to continuously operate in the silent mode even when the connection between the digital camera 100 and the headphone is disconnected. In this way, since the digital camera 100 continuously operates in the silent mode even when the headphone is unexpectedly disconnected from the digital camera 100, the electronic sound is not output from the speaker 108 of the digital camera 100. Therefore, no noise comes out of the digital camera 100.

The digital camera 100 may be configured to be connectable with a plurality of headphones. In this case, the digital camera 100 is automatically switched to the silent mode by detecting that a first headphone is connected to the digital camera 100. Even when all headphones are disconnected, the control unit 101 causes the digital camera 100 to continuously operate in the silent mode. In this way, for example, the user can reproduce a moving image recorded on the recording medium 110 in the digital camera 100 and the moving image and audio associated with the moving image can be shared by a plurality of people.

In general, headphones are wirelessly connected to an electronic apparatus in accordance with Bluetooth®. In communication through Bluetooth®, the control unit 101 records the type of a paired apparatus. On the other hand, most of general headphones do not support wireless LAN communication. In communication via a wireless LAN, the digital camera 100 transmits and receives image data, moving image data, and the like. Accordingly, the digital camera 100 may be configured to execute the processing in wireless connection in accordance with Bluetooth®, and not to execute the processing in wireless connection via a wireless LAN. In this way, the digital camera 100 can transmit captured image data to a smartphone wirelessly connected via a wireless LAN, while outputting a sound to the headphones wirelessly connected through Bluetooth®.

Next, a second exemplary embodiment will be described. Processing to be performed when a user operation is accepted through the operation unit 105 during a period from a time when the digital camera 100 starts connecting with the headphone to a time when the connection is established will be described. In particular, in the case of wirelessly connecting the external apparatus, it may take a long time for the control unit 101 to start a wireless connection and complete the wireless connection. In this case, the type of the external apparatus that is being connected is unknown until the connection with the external apparatus is established. Accordingly, there is a possibility that the digital camera 100 may be operated by the user before the digital camera 100 establishes the connection with the headphone. In this case, when the external apparatus is a speaker, an electronic sound may be output from the speaker 108 of the digital camera 100 even after the user has intentionally operated the digital camera 100 to operate in the silent mode. Accordingly, in a second exemplary embodiment, during the period from the time when the connection between the digital camera 100 and the headphone is started to the time when the connection is completed, the control unit 101 performs a control operation for preventing the output of the electronic sound from the speaker 108 of the digital camera 100. The digital camera 100 used in the present exemplary embodiment is similar to that used in the first exemplary embodiment.

Figure 5:
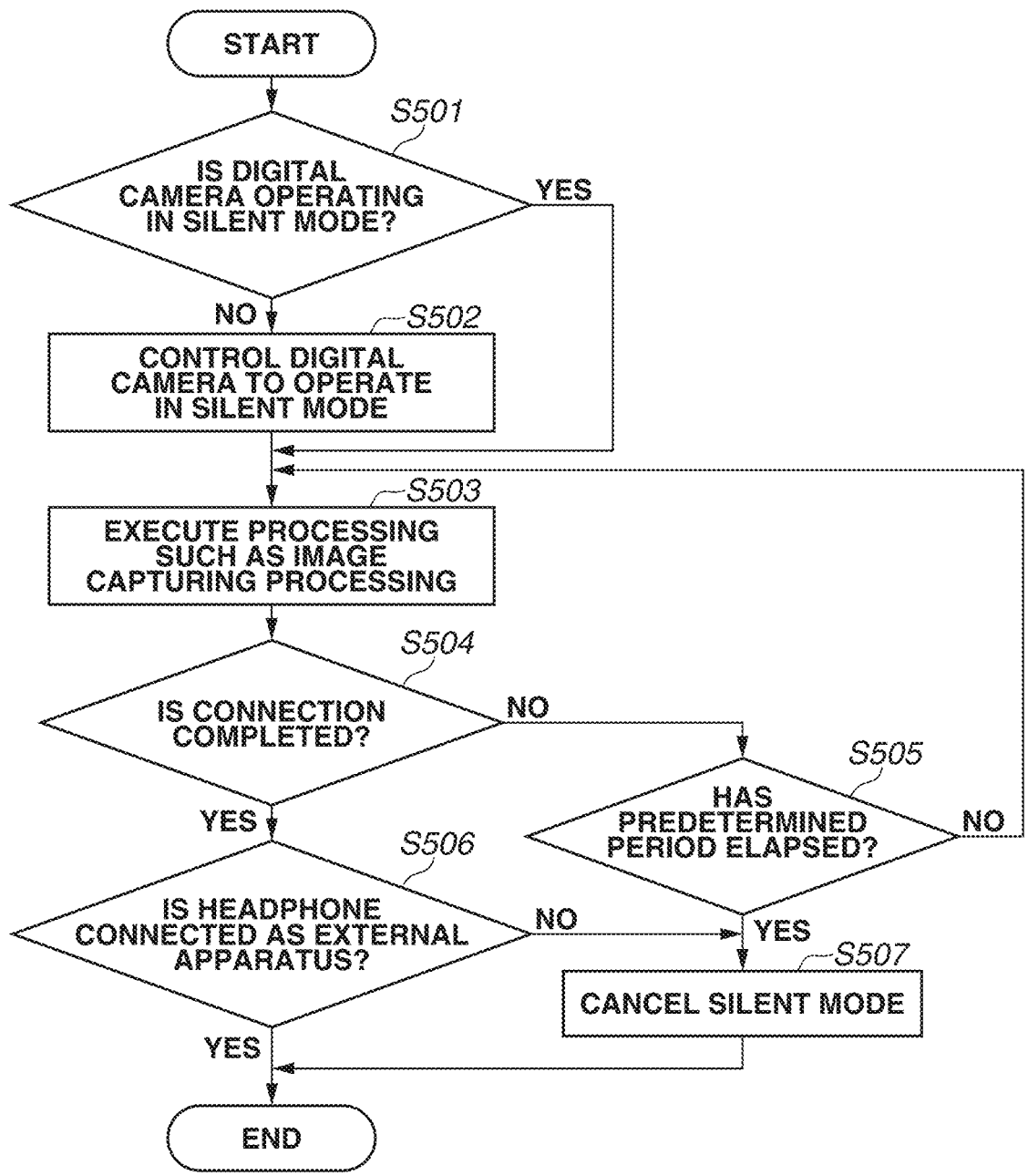
FIG. 5 is a flowchart illustrating an example of an operation of a digital camera according to a second exemplary embodiment.

An example of a method in which the control unit 101 performs the control operation for preventing the output of the electronic sound from the speaker 108 of the digital camera 100 during the period from the time when the digital camera 100 starts connecting with the headphone to the time when the connection is completed will be described with reference to FIG. 5. The present exemplary embodiment is described assuming that the external speaker connected to the digital camera 100 is a headphone. The processing by the digital camera 100 is implemented in such a manner that software recorded on the nonvolatile memory 103 is loaded into the work memory 104 and the control unit 101 executes the software. This processing is started when the external apparatus starts connecting to the digital camera 100.

In step S501, the control unit 101 determines whether the digital camera 100 is operating in the silent mode. If the digital camera 100 is not operating in the silent mode (NO in step S501), the processing proceeds to step S502. If the digital camera 100 is operating in the silent mode (YES in step S501), the processing proceeds to step S503.

In step S502, the control unit 101 controls the digital camera 100 to operate in the silent mode. Further, the control unit 101 records the setting for the shutter mode before causing the digital camera 100 to operate in the silent mode. The recorded shutter mode is used for processing in which the control unit 101 cancels the silent mode in step S507.

In step S503, the control unit 101 executes processing corresponding to a user operation performed through the operation unit 105. For example, when the release switch is pressed, the control unit 101 executes image capturing processing. For example, when reproduction of moving image data recorded on the recording medium 110 is instructed through the operation unit 105, the control unit 101 reproduces the moving image data on the display unit 106. In this case, the control unit 101 causes the digital camera 100 to operate in the silent mode and performs the control operation for preventing the output of any sound from the speaker 108.

In step S504, the control unit 101 determines whether the connection with the external apparatus is completed. If the connection with the external apparatus is not completed (NO in step S504), the processing proceeds to step S505. If the connection with the external apparatus is completed (YES in step S504), the processing proceeds to step S506.

In step S505, the control unit 101 determines whether a predetermined period has elapsed since the connection with the external apparatus is started. For example, when one minute is set as the predetermined period, the control unit 101 determines whether one minute has elapsed since the connection with the external apparatus is started. If the predetermined period has not elapsed since the connection with the external apparatus is started (NO in step S505), the processing returns to step S503 to execute the processing corresponding to the user operation. If the predetermined period has elapsed since the connection with the external apparatus is started, the control unit 101 determines that the connection with the external apparatus is failed (YES in step S505), and then the processing proceeds to step S507.

In step S506, the control unit 101 determines whether the external apparatus with which the connection is successfully established is the headphone. If the external apparatus with which the connection is successfully established is the headphone (YES in step S506), the control unit 101 terminates the processing. After that, the control unit 101 controls the digital camera 100 to continuously operate in the silent mode. If the external apparatus with which the connection is successfully established is not the headphone (NO in step S506), the processing proceeds to step S507.

In step S507, the control unit 101 cancels the silent mode of the digital camera 100 and controls the digital camera 100 to operate in the shutter mode recorded in step S502. If the silent mode is set when the processing of this flowchart, is started, the control unit 101 does not execute the processing of step S507. For example, if it is determined that the digital camera 100 is operating in the silent mode in step S501, the control unit 101 does not execute the processing of step S507.

The method in which the control unit 101 performs the control operation for preventing the output of the electronic sound from the speaker 108 of the digital camera 100 during the period from the time when the digital camera 100 starts connecting with the headphone to the time when the connection is completed has been described above. As described above, the digital camera 100 is caused to operate in the silent mode triggered by the connection with the external apparatus being started, and the setting for causing the digital camera 100 to continuously operate in the silent mode is changed depending on the result of the connection with the external apparatus. In this way, it is possible to prevent the output of the electronic sound from the speaker 108, which is unintended by the user. In particular, if the imaging opportunity to click the shutter has come before the digital camera 100 establishes the connection with the headphone, the user can capture an image in the silent mode. Accordingly, the processing according to the present exemplary embodiment is particularly effective for an image capturing apparatus such as a digital camera.

A third exemplary embodiment is a modified example of the first exemplary embodiment. Even in a case where a headphone is connected to the digital camera 100 by a user, the user may not be wearing the headphone. In this case, the user cannot hear an electronic sound from the headphone even when the electronic sound is output to the headphone. Accordingly, there is no need for the digital camera 100 to output the electronic sound to the headphone. Even in a case where the headphone is connected to the digital camera 100 by the user, the user may wish to output the electronic sound from the speaker 108 of the digital camera 100. Accordingly, the digital camera 100 according to the present exemplary embodiment can cope with such a situation. The digital camera 100 used in the present exemplary embodiment is similar to that used in the first exemplary embodiment.

Figure 6:
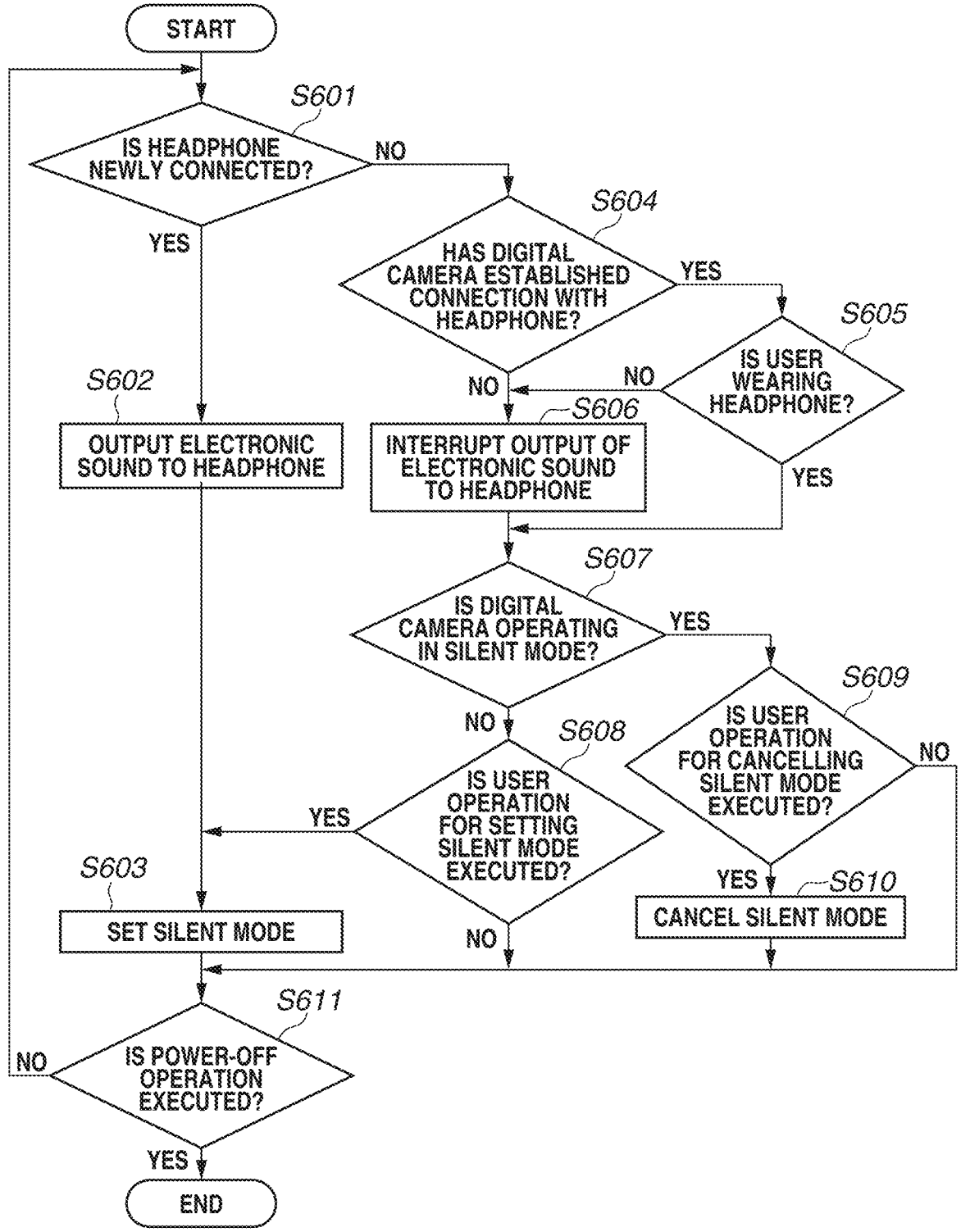
FIG. 6 is a flowchart illustrating an example of an operation of a digital camera according to a third exemplary embodiment.

Processing in which the control unit 101 changes the setting for causing the digital camera 100 to operate in the silent mode will be described with reference to FIG. 6. The present exemplary embodiment is described assuming that the external speaker connected to the digital camera 100 is a headphone. This headphone includes a sensor, which enables detection whether the user is wearing the headphone. The processing by the digital camera 100 is implemented in such a manner that software recorded on the nonvolatile memory 103 is loaded into the work memory 104 and the control unit 101 executes the software. This processing is started at power-on of the digital camera 100.

In step S601, the control unit 101 determines whether the headphone is newly connected to the digital camera 100. For example, the control unit 101 determines whether the connection with the headphone through the detection unit of the connection unit 112 or the communication unit 111 is completed. In the present exemplary embodiment, the control unit 101 determines whether the headphone is newly connected from a state where no headphone is connected. If the headphone is already connected, the determination result of the control unit 101 in step S601 indicates "NO" even when the headphone is newly connected. However, if the headphone is connected in a state where the digital camera 100 is powered off, in first processing after the digital camera 100 is powered on, the control unit 101 determines that the headphone is newly connected. If the headphone is newly connected (YES in step S601), the processing proceeds to step S602. If the headphone is not newly connected (NO in step S601), the processing proceeds to step S604. The case Where the headphone is newly connected to the digital camera 100 will now be described.

In step S602, the control unit 101 performs the control operation for outputting the electronic sound to the connected headphone. This does not indicate that the control unit 101 constantly outputs the electronic sound to the headphone, but indicates that the control unit 101 outputs the electronic sound to the headphone when the electronic sound, such as an operation sound or an electronic shutter sound, is reproduced.

In step S603, the control unit 101 controls the digital camera 100 to automatically operate in the silent mode. Further, the control unit 101 may record the setting for the shutter mode before causing the digital camera 100 to operate in the silent mode. This recorded shutter mode is used for processing in which the control unit 101 cancels the silent mode in step S610. If the silent mode is already set, the control unit 101 does not execute the processing of step S603. Then, the processing proceeds to step S611, and the processing of this flowchart is repeated until the power-off operation is executed (NO in step S611). Step S603 is similar to step S403 illustrated in FIG. 4. As described above, if the headphone is newly connected to the digital camera 100, the control unit 101 controls the digital camera 100 to operate in the silent mode. Next, the case where the control unit 101 determines that the headphone is not newly connected in step S601 will be described.

In step S604, the control unit 101 determines whether the digital camera 100 has established a connection with the headphone. For example, the control unit 101 detects whether the digital camera 100 has established a connection with the headphone through the detection unit of the connection unit 112 or the communication unit 111. If it is determined that the digital camera 100 has established a connection with the headphone (YES in step S604), the processing proceeds to step S605. If it is determined that the connection between the digital camera 100 and the headphone is disconnected (NO in step S604), the processing proceeds to step S606 to perform the control operation for preventing the output of the electronic sound to the headphone.

In step S605, the control unit 101 receives, from the headphone, information indicating whether the user is wearing the headphone, and determines whether the user is wearing the headphone. If the user is wearing the headphone (YES in step S605), the processing proceeds to step S607 to execute processing for setting the silent mode. If the user is not wearing the headphone (NO in step S605), the processing proceeds to step S606 to stop the output of the electronic sound to the headphone.

Figure 4:
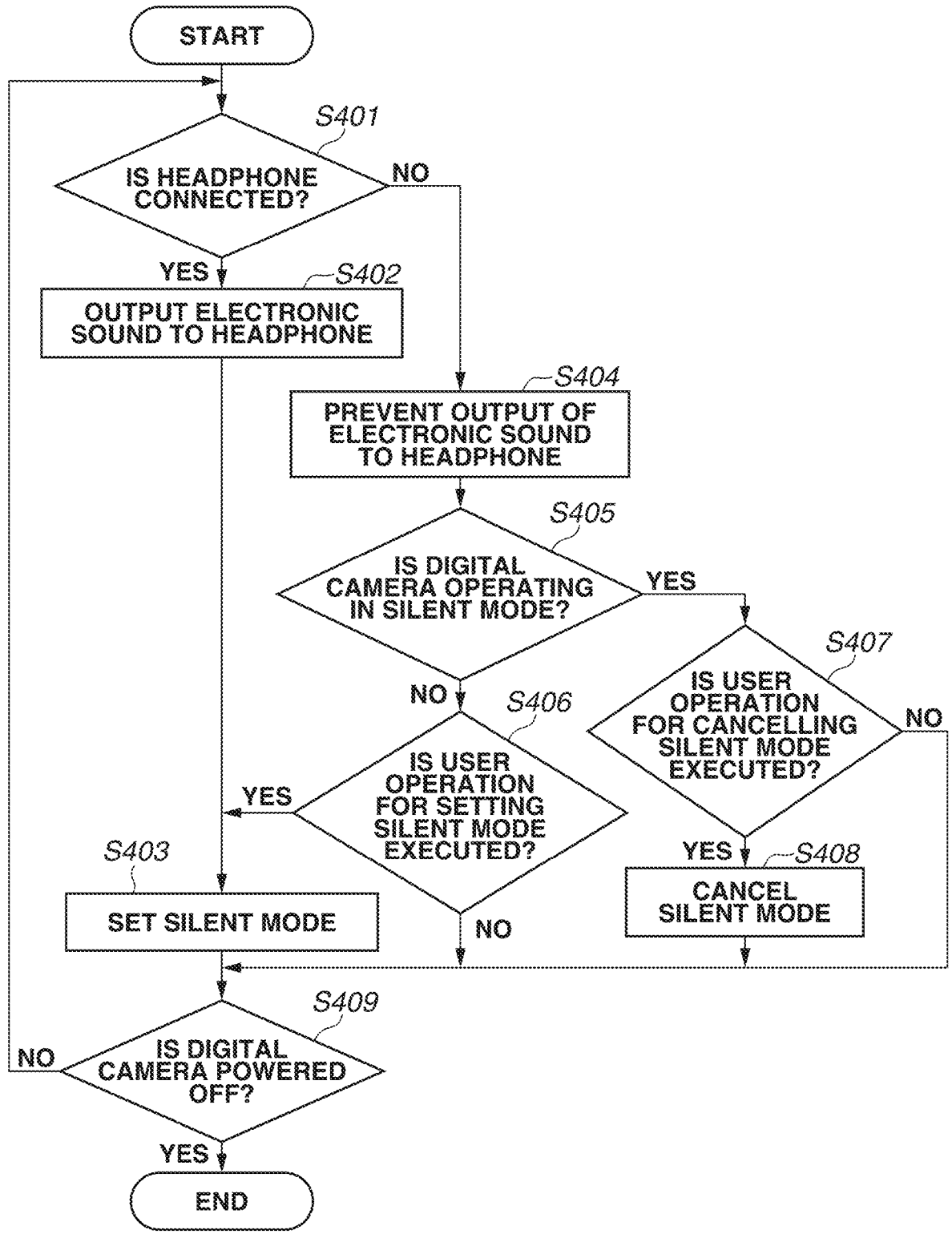
FIG. 4 is a flowchart illustrating an example of an operation of the digital camera according to the first exemplary embodiment.

Steps S606 to S611 are respectively similar to steps S404 to S409 illustrated in FIG. 4. Accordingly, the descriptions thereof are omitted.

The processing in which the control unit 101 determines whether to cause the digital camera 100 to operate in the silent mode has been described above with reference to FIG. 6. As described above, the control unit 101 executes the processing of this flowchart, thereby enabling the speaker 108 of the digital camera 100 to output the electronic sound even when the headphone is connected to the digital camera 100 by the user. If the user is not wearing the headphone, the control unit 101 stops the output of the electronic sound to the headphone, which leads to a reduction in power consumption of the digital camera 100 and the headphone.

In a fourth exemplary embodiment, the control unit 101 changes the processing to be performed when the connection with the headphone is disconnected, depending on whether the digital camera 100 has established a wireless connection or a wired connection with the external speaker such as a headphone. The digital camera 100 used in the present exemplary embodiment is similar to that used in the first exemplary embodiment.

Figure 7:
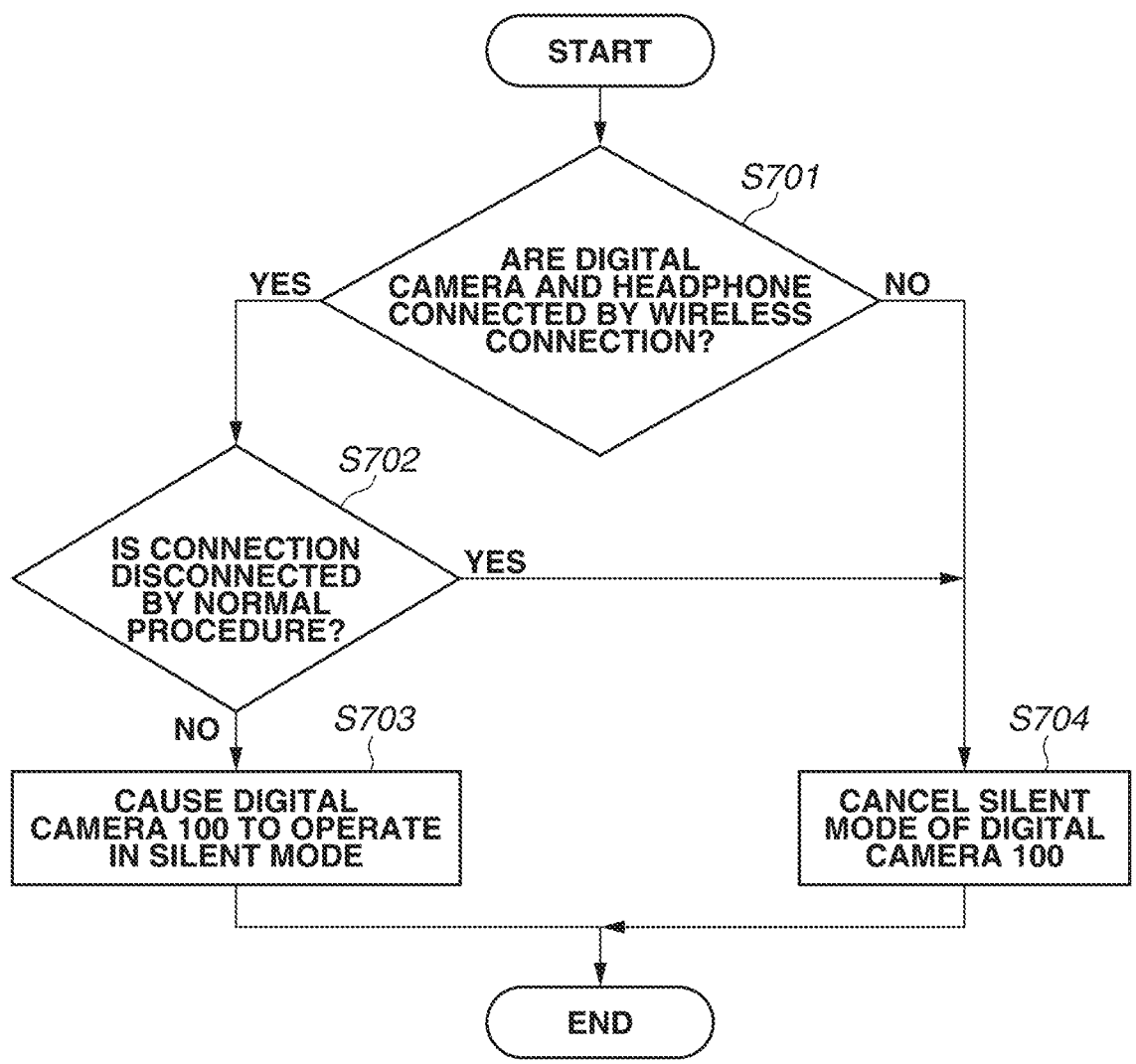
FIG. 7 is a flowchart illustrating an example of an operation of a digital camera according to a fourth exemplary embodiment.

Processing performed by the control unit 101 when the headphone is disconnected from the digital camera 100 depending on a connection method between the headphone and the digital camera 100 will be described with reference to FIG. 7. Wireless communication may be interrupted depending on circumstances. On the other hand, wired communication is less likely to be interrupted depending on circumstances, unlike wireless communication. In addition, in wired communication, it is more likely that the user intentionally performs an operation for connecting or disconnecting the communication. Accordingly, in the present exemplary embodiment, after the headphone is disconnected from the digital camera 100, the control unit 101 changes the operation mode of the digital camera 100 depending on the connection method between the headphone and the digital camera 100. The present exemplary embodiment is described assuming that the external speaker to be connected to the digital camera 100 is a headphone. This headphone includes a sensor, which enables detection whether the user is wearing the headphone. The processing by the digital camera 100 is implemented in such a manner that software recorded on the nonvolatile memory 103 is loaded into the work memory 104 and the control unit 101 executes the software. This processing is started when the connection between the digital camera 100 and the headphone is disconnected.

In step S701, the control unit 101 determines whether the digital camera 100 and the headphone are connected by wireless connection. If the digital camera 100 and the headphone are connected by wireless connection (YES in step S701), the processing proceeds to step S702. If the digital camera 100 and the headphone are connected by wired connection (NO in step S701), the processing proceeds to step S704 to cancel the silent mode of the digital camera 100.

In step S702, the control unit 101 determines whether the connection between the digital camera 100 and the headphone is disconnected by a normal procedure. If the connection is disconnected by the normal procedure, a packet indicating that the wireless connection is disconnected by at least one of the digital camera 100 and the headphone is transmitted. Transmitting and receiving the packet enable the control unit 101 to determine that the wireless connection is disconnected by the normal procedure. On the other hand, if the communication is suddenly interrupted due to some reasons such as battery exhaustion of the headphone, the control unit 101 detects a timeout. Through this detection, the control unit 101 determines that the wireless connection is not disconnected by the normal procedure. If the wireless connection is not disconnected by the normal procedure (NO in step S702), the processing proceeds to step S703 to cause the digital camera 100 to continuously operate in the silent mode. If the wireless connection is disconnected by the normal procedure (YES in step S702), the processing proceeds to step S704 to cancel the silent mode of the digital camera 100.

As described above, the processing to be performed by the control unit 101 when the connection between the digital camera 100 and the headphone is disconnected is changed depending on the connection method between the digital camera 100 and the headphone. Further, in the wireless connection, the control unit 101 turns on or off the silent mode depending on whether the connection is disconnected by the normal procedure. In this way, the possibility of outputting the electronic sound from the speaker 108 of the digital camera 100 at a timing unintended by the user can be reduced.

The digital camera 100 may be configured to be connectable to a plurality of headphones. In this case, a wired headphone and a wireless headphone can be simultaneously connected to the digital camera 100. Accordingly, such a condition that the processing according to the present exemplary embodiment is executed when the number of headphones connected to the digital camera 100 is one is set as a trigger for starting the processing. By providing such a condition, the digital camera 100 operates in the silent mode when the headphone is connected to the digital camera 100, regardless of whether the connection is established by wired connection or wireless connection. If the last connected headphone is disconnected, the control unit 101 starts the processing described in the present exemplary embodiment.

In a fifth exemplary embodiment, if the digital camera 100 is wirelessly connected with a wearable external speaker, such as a headphone, the control unit 101 determines whether to cause the digital camera 100 to continuously operate in the silent mode depending on factors that disconnects the wireless connection with the headphone. The digital camera 100 used in the present exemplary embodiment is similar to that used in the first exemplary embodiment. The present exemplary embodiment is described assuming that the external speaker to be connected to the digital camera 100 is a wearable external speaker.

Figure 8:
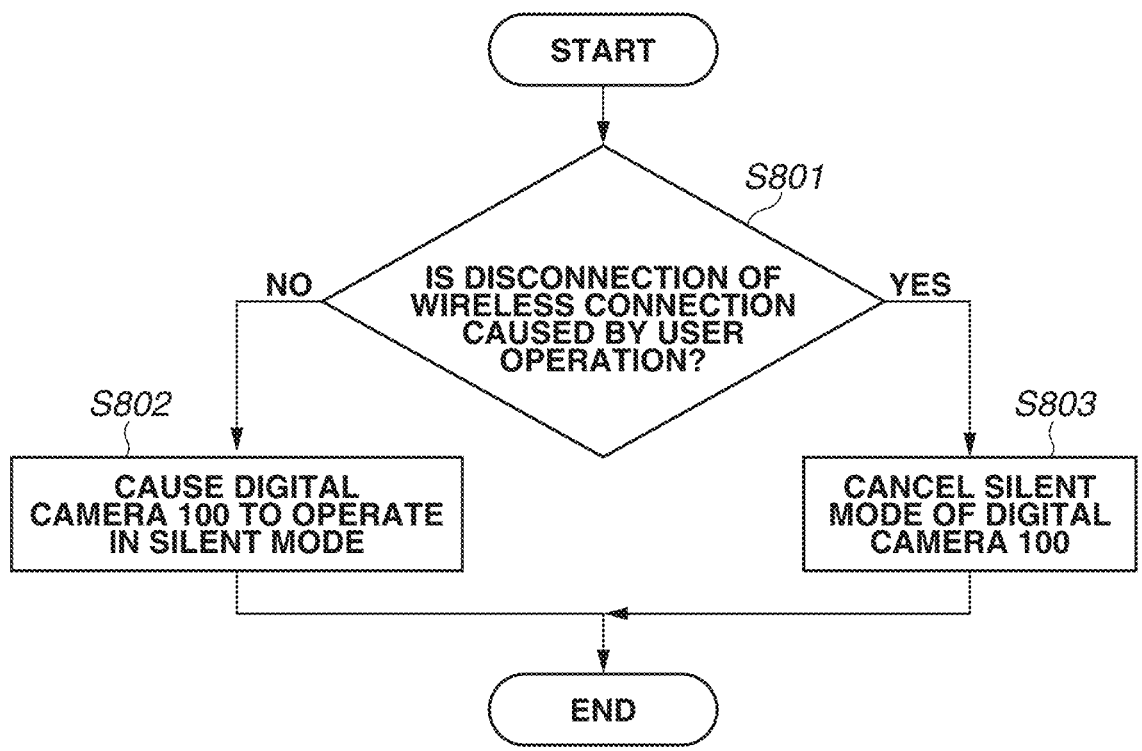
FIG. 8 is a flowchart illustrating an example of an operation of a digital camera according to a fifth exemplary embodiment.

Processing to be performed by the control unit 101 when the wireless connection with the headphone is disconnected according to the present exemplary embodiment will be described with reference to FIG. 8. The wireless communication may be interrupted due to surrounding radio wave conditions or the like. In this case, since the user believes that the user is using the headphone, the digital camera 100 may desirably prevent the output of the electronic sound from the internal speaker. On the other hand, for example, if the user has put the headphone into a case, it can be regarded that the user does not use the headphone at this time, so that the digital camera 100 can determine that the electronic sound can be output from the internal speaker in this situation. Accordingly, in the present exemplary embodiment, the control unit 101 changes the operation mode of the digital camera 100 depending on factors that disconnect the wireless connection with the headphone. This headphone includes a sensor, which enables detection whether the user is wearing the headphone.

The processing by the digital camera 100 is implemented in such a manner that software recorded on the nonvolatile memory 103 is loaded into the work memory 104 and the control unit 101 executes the software. This processing is started triggered by the wireless connection between the digital camera 100 and the headphone being disconnected.

In step S801, the control unit 101 determines whether the wireless connection between the digital camera 100 and the headphone is disconnected by a user operation. For example, if the user operates the operation unit 105 to disconnect the wireless connection between the digital camera 100 and the headphone, the digital camera 100 transmits to the headphone a packet indicating that the wireless connection is disconnected. For example, if the user has put the headphone into a case, or if the user has removed the headphone from the user's ears, the headphone transmits to the digital camera 100 a packet indicating that the wireless connection is disconnected. Thus, in the case of disconnecting the wireless connection by transmitting and receiving the packet indicating that the wireless connection is disconnected, the control unit 101 determines that the wireless connection is disconnected by a user operation. On the other hand, for example, if the communication is suddenly interrupted due to some reasons such as battery exhaustion of the headphone or deterioration in surrounding radio wave conditions, the control unit 101 detects a timeout. If the control unit 101 detects a timeout, the control unit 101 determines that the wireless connection with the headphone is disconnected. In this case, the control unit 101 determines that the wireless connection is not disconnected by a user operation. If the control unit 101 determines that the wireless connection is not disconnected by a user operation (NO in step S801), the processing proceeds to step S802. In step S802, the control unit 101 continuously controls the digital camera 100 to operate in the silent mode. If the control unit 101 determines that the wireless connection is disconnected by a user operation (YES in step S801), the processing proceeds to step S803. In step S803, the control unit 101 cancels the silent mode of the digital camera 100 and performs the control operation for causing the speaker 108 to output the electronic sound.

As described above, the control unit 101 determines whether to cause the digital camera 100 to continuously operate in the silent mode depending on factors that disconnect the wireless connection with the headphone. In this way, the possibility of outputting the electronic sound from the speaker 108 of the digital camera 100 at a timing unintended by the user can be reduced.

While the first to fifth exemplary embodiments described above illustrate a headphone as an example of the external speaker to be connected to the digital camera 100. However, the external speaker is not limited thereto. For example, the external speaker may be an information processing apparatus, such as a smartphone or a PC, which is connectable to a digital camera 100.

For example, a smartphone is connected to the digital camera 100, a setting for determining whether the digital camera 100 operates in the silent mode may be made depending on the mode of the smartphone. In this case, the control unit 101 receives information about a current mode from the smartphone through the communication unit 111 or the connection unit 112. If the smartphone is a manner mode, a silent mode, or an airplane mode, the digital camera 100 operates in the silent mode. If the smartphone is in a mode in which an electronic sound can be output from a speaker of the smartphone, the digital camera 100 does not change the mode.

If the connection partner includes no function for outputting sound or voice, the control unit 101 does not execute the processing for causing the digital camera 100 to operate in the silent mode. For example, when a remote controller, a flash, or the like is connected to the digital camera 100, the digital camera 100 is not automatically shifted to the silent mode. For example, when a keyboard, a mouse, a charger, or the like is connected to the smartphone, the smartphone is not automatically shifted to the silent mode.

Figure 9:
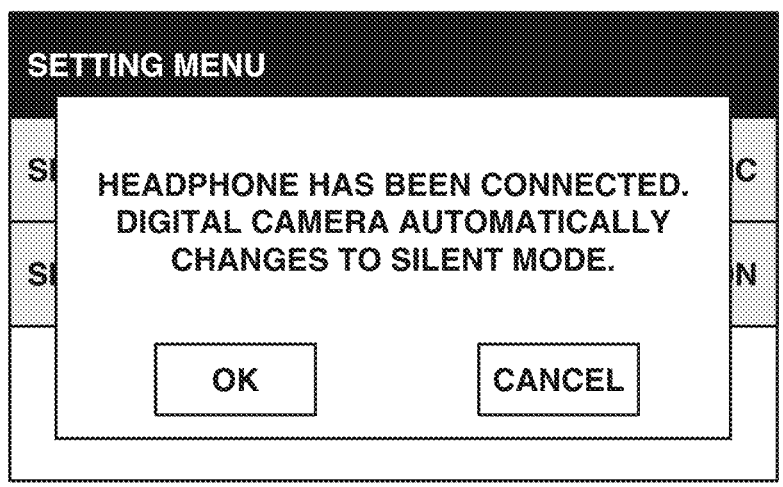
FIG. 9 illustrates an example of a method for informing that the digital camera is caused to automatically operate in the silent mode.

Further, when the control unit 101 causes the digital camera 100 to automatically operate in the silent mode, the control unit 101 may inform the user that the digital camera 100 automatically operates in the silent mode. For example, as illustrated in FIG. 9, the control unit 101 displays a pop-up window on the display unit 106 to display such a message that "A headphone has been connected. The digital camera automatically changes to silent mode." to inform that the headphone is connected and the digital camera 100 automatically changes to the silent mode. In this case, the control unit 101 causes the digital camera 100 to automatically operate in the silent mode, but instead a cancellation operation may be performed by the user. In this case, the control unit 101 accepts the user operation through the operation unit 105. If "OK" is selected, the control unit 101 causes the digital camera 100 to operate in the silent mode. If "Cancel" is selected, the control unit 101 causes the digital camera 100 to return to the setting made before the digital camera 100 is caused to operate in the silent mode. However, even when "Cancel" is selected, the control unit 101 outputs a sound to the headphone. The control unit 101 executes informing processing as described above, thereby enabling the user to change the mode of the digital camera 100 depending on circumstances.

The present disclosure can also be implemented by processing in which a program for implementing one or more functions according to the exemplary embodiments described above is supplied to a system or an apparatus via a network or a storage medium, and one or more processors in a computer of the system or the apparatus read out the program and execute the program. The present disclosure can also be implemented by a circuit (e.g., an application specific integrated circuit (ASIC)) for implementing one or more functions according to the exemplary embodiments described above.

The present disclosure is not limited to the exemplary embodiments described above, and constituent elements can be modified and embodied in an implementation phase without departing from the scope of the present invention. Further, various inventions can be formed by appropriately combining a plurality of constituent elements disclosed in the exemplary embodiments described above. For example, some of the constituent elements may be omitted from the overall constituent elements described in the exemplary embodiments. Furthermore, constituent elements in different exemplary embodiments may be combined as appropriate.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-026719, filed Feb. 18, 2019, which is hereby incorporated by reference herein in its entirety.

What is claimed is:

1. An electronic apparatus comprising:
an internal speaker;
a communication interface for establishing a wireless connection with an external apparatus; and
one or more processors,
wherein the one or more processors establish a wireless connection with an external speaker through the communication interface,
wherein the one or more processors determine whether the external speaker is disconnected by a first factor or the external speaker is disconnected by a second factor different from the first factor,
wherein the one or more processors continuously perform a control operation for not outputting of an audio signal from the internal speaker in a case where it is determined that the wireless connection with the external speaker is disconnected by the first factor in a state where the one or more processors perform the control operation, and wherein the one or more processors cancel the performance of the control operation in a case where it is determined that the wireless connection with the external speaker is disconnected by the second factor different from the first factor in a state where the one or more processors are performing the control operation for not outputting of the audio signal from the internal speaker, and the one or more processors cancel the performance of the control operation.

2. The electronic apparatus according to claim 1, further comprising a user interface configured to accept a user operation, wherein the one or more processors perform the control operation for not outputting of the audio signal from the internal speaker, in a case where the one or more processors accept, through the user interface, a user operation for not outputting of the audio signal from the internal speaker in a state where the one or more processors control the internal speaker to output the audio signal, and wherein the one or more processors perform a control operation for permitting the output of the audio signal from the internal speaker, in a case where the one or more processors accept, through the user interface, a user operation for outputting the audio signal from the internal speaker in a state where the one or more processors perform the control operation for not outputting of the audio signal from the internal speaker.

3. The electronic apparatus according to claim 2, wherein the one or more processors control the user interface not to accept the user operation for outputting the audio signal from the internal speaker in a case where a wireless connection with the external speaker is established through the communication interface.

4. The electronic apparatus according to claim 2, wherein the one or more processors perform a control operation for disconnecting the established connection with the external speaker and permitting the output of the audio signal from the internal speaker in a case where the one or more processors accept through the user interface an operation for disconnecting the established connection with the external speaker in a state where the one or more processors perform the control operation for not outputting of the audio signal from the internal speaker.

5. The electronic apparatus according to claim 2, wherein the second factor includes a user operation for disconnecting the wireless connection with the external speaker through the user interface.

6. The electronic apparatus according to claim 1, wherein the one or more processors control the communication interface to perform communication for disconnecting the wireless connection with the external speaker in a case where the wireless connection with the external speaker is disconnected by the second factor, and wherein the one or more processors do not perform the communication for disconnecting the wireless connection with the external speaker in a case where the wireless connection with the external speaker is disconnected by the first factor.

7. The electronic apparatus according to claim 1, wherein the one or more processors perform the control operation for not outputting of the audio signal from the internal speaker in a case where the wireless connection with the external speaker is started through the communication interface, wherein the one or more processors continuously perform the control operation for not outputting of the audio signal from the internal speaker in a case where the wireless connection with the external speaker is established, and wherein the one or more processors perform a control operation for permitting the output of the audio signal from the internal speaker in a case where the wireless connection with the external speaker is not established.

8. The electronic apparatus according to claim 1, further comprising an image sensor, wherein the one or more processors control the image sensor to capture an image without using a mechanical shutter in a case where the one or more processors perform the control operation for not outputting of the audio signal from the internal speaker.

9. The electronic apparatus according to claim 8, wherein the one or more processors perform the control operation for not outputting of the audio signal from the internal speaker and a control operation for permitting the output of the audio signal from the external speaker in a case where the image sensor capture an image in a state where the wireless connection with the external speaker is established.

10. The electronic apparatus according to claim 8, wherein the one or more processors perform a control operation for permitting an output of an electronic shutter sound from one of the internal speaker and the external speaker in a case where the image sensor captures an image.

11. The electronic apparatus according to claim 8, wherein in a case where the one or more processors perform the control operation for not outputting of the audio signal from the internal speaker, the one or more processors perform a control operation for not emitting light during image capturing by the image sensor.

12. The electronic apparatus according to claim 1, wherein the external speaker includes a headphone or an earphone.

13. The electronic apparatus according to claim 1, wherein, in response to performing the control operation, the one or more processors inform a user that the one or more processors perform the control operation.

14. A control method of an electronic apparatus including an internal speaker and a communication interface for establishing a wireless connection with an external apparatus, the control method comprising:

establishing wireless connection with an external speaker through the communication interface;

determining whether the external speaker is disconnected by a first factor or the external speaker is disconnected by a second factor different from the first factor, continuously performing a control operation for not outputting of an audio signal from the internal speaker in a case where the wireless connection with the external speaker is disconnected by a first factor in a state where the control operation for not outputting of the audio signal from the internal speaker is performed; and cancelling performance of the control operation in a case where the wireless connection with the external speaker is disconnected by a second factor different from the first factor in a state where the control operation for not outputting of the audio signal from the internal speaker is performed, cancelling performance of the control operation.

15. A non-transitory computer-readable storage medium storing a program for causing an electronic apparatus including an internal speaker and a communication interface for establishing a wireless connection with an external apparatus, to execute a control method, the control method comprising:
- establishing wireless connection with an external speaker through the communication unit;
- determining whether the external speaker is disconnected by a first factor or the external speaker is disconnected by a second factor different from the first factor,
- continuously performing a control operation for not outputting of an audio signal from the internal speaker in a case where the wireless connection with the external speaker is disconnected by a first factor in a state where the control operation for not outputting of the audio signal from the internal speaker is performed; and
- cancelling performance of the control operation for not outputting of the audio signal from the internal speaker in a case where the wireless connection with the external speaker is disconnected by a second factor different from the first factor in a state where the control operation for not outputting of the audio signal from the internal speaker is performed, cancelling performance of the control operation.

* * * * *